(12) United States Patent
Newberg et al.

(10) Patent No.: US 8,424,946 B2
(45) Date of Patent: Apr. 23, 2013

(54) TABLE AND CHAIR(S) REMOVABLE FROM AN AUTOMOTIVE VEHICLE

(75) Inventors: Travis Newberg, Columbus, OH (US); Yousuf Riad, Dublin, OH (US); Christopher David Hall, Dublin, OH (US); Michael P. Hullihan, Dublin, OH (US); Joshua Kramer, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 72 days.

(21) Appl. No.: 13/158,889

(22) Filed: Jun. 13, 2011

(65) Prior Publication Data

US 2012/0313395 A1  Dec. 13, 2012

(51) Int. Cl.
*B62D 25/08* (2006.01)

(52) U.S. Cl.
USPC ............... 296/65.03; 108/44; 297/378.12

(58) Field of Classification Search .............. 296/57.1, 296/65.03, 65.16, 26.11, 35.3, 39.2, 65.09, 296/1.08; 108/44, 90, 32; 297/378.12; *B62D 25/08*
See application file for complete search history.

(56) References Cited

U.S. PATENT DOCUMENTS

| | | | | |
|---|---|---|---|---|
| 2,228,203 A * | 1/1941 | De Hoffmann | | 5/119 |
| 3,338,620 A | 8/1967 | Cauvin | | |
| 3,756,655 A * | 9/1973 | Perkins | | 297/378.12 |
| 5,711,569 A * | 1/1998 | Sovoda | | 296/57.1 |
| 5,741,046 A * | 4/1998 | Leuchtmann et al. | | 297/378.13 |
| 5,823,595 A | 10/1998 | Tronco | | |
| 5,992,331 A | 11/1999 | Inoue et al. | | |
| 6,012,755 A | 1/2000 | Hecht et al. | | |
| 6,364,391 B1 | 4/2002 | Everett | | |
| 6,749,247 B1 * | 6/2004 | Mack et al. | | 296/65.09 |
| 6,808,231 B1 * | 10/2004 | Hill | | 297/217.7 |
| 6,935,064 B1 * | 8/2005 | Thompson | | 42/94 |
| 7,159,917 B2 | 1/2007 | Haaberg | | |
| 7,252,337 B2 * | 8/2007 | Hofmann et al. | | 297/383 |
| 7,309,202 B1 * | 12/2007 | Anderson | | 414/537 |
| 7,354,090 B1 * | 4/2008 | Pomorski | | 296/26.11 |
| D593,760 S * | 6/2009 | Fidler | | D6/338 |
| 7,614,702 B2 * | 11/2009 | Kubler et al. | | 297/378.13 |
| 7,628,439 B1 * | 12/2009 | Strong | | 296/26.03 |
| 7,798,550 B2 | 9/2010 | Stefanon | | |
| 7,819,465 B2 * | 10/2010 | Elliott et al. | | 296/202 |
| 8,029,038 B2 * | 10/2011 | Woodhouse et al. | | 296/63 |
| 2003/0075943 A1 * | 4/2003 | Kirchhoff | | 296/26.11 |
| 2005/0241546 A1 * | 11/2005 | Royse | | 108/44 |
| 2009/0322113 A1 * | 12/2009 | Parnaik et al. | | 296/37.16 |

* cited by examiner

*Primary Examiner* — Glenn Dayoan
*Assistant Examiner* — Pinel Romain
(74) *Attorney, Agent, or Firm* — Fay Sharpe LLP

(57) ABSTRACT

An automotive vehicle including a removable table and chair set is described. The set is constructed from a removable front passenger seat configured to releasably engage a seat mounting member secured to the vehicle and includes at least two legs configured to support the front passenger seat when positioned on a surface outside of the vehicle. A removable structural component of the vehicle is configured to releasably engage the vehicle and includes at least two extendable leg elements configured to support the structural component as a table when positioned on a surface outside of the vehicle. A removable rear passenger seat is configured to releasably engage a seat mounting member secured to the vehicle and includes at least two legs configured to support the rear passenger seat when positioned on a surface outside of the vehicle.

21 Claims, 4 Drawing Sheets

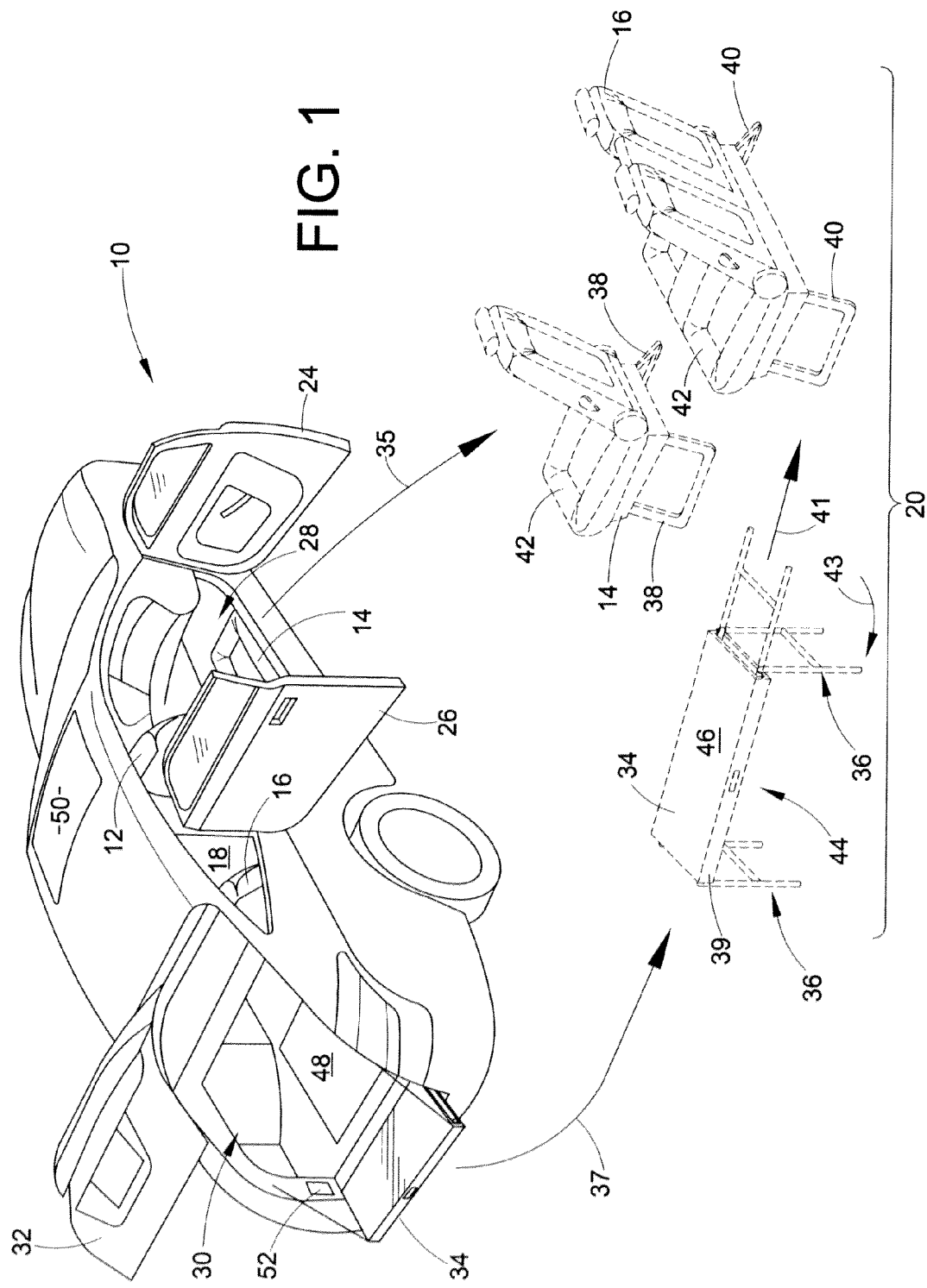

TABLE AND CHAIR(S) REMOVABLE FROM AN AUTOMOTIVE VEHICLE

BACKGROUND

The present exemplary embodiment relates to an automotive vehicle. It finds particular application in conjunction with a vehicle including components that can be removed and used externally as a table and chair(s) set, and will be described with particular reference thereto. However, it is to be appreciated that the present exemplary embodiment is also amenable to other like applications.

Automotive vehicles having components that are removable to function as either a table or a chair have been previously described. For example, some vehicles are provided with one or more seats that are used for passenger travel but are also removable from the vehicle. When such seats are removed from the vehicle, the latching mechanisms used to secure the seat to the vehicle are not configured to support the seat and often result in poor stability and support of the seat on the ground surface as well as uncomfortable seating conditions for a person sitting on the seat outside of the vehicle. Accordingly, a removable vehicle seat may include a plurality of legs configured to support the removed vehicle seat when the seat is placed on a surface outside of the vehicle.

With respect to tables, trade persons, particularly carpenters, siding installers, and the like have need of a stable, relatively large sized work area at an outdoor construction site, particularly a long work bench. It is known that pickup trucks and other truck like vehicles have fold down rear tailgates which can serve as a rudimentary work surface. Various examples exist of converting a truck tailgate into a table. Similarly, a truck bed convertible into a table is known.

A further alternative of an automotive vehicle including a removable table is a plate for use as a lid of a cargo area. The plate is removed from the vehicle and includes a top side and legs pivotally mounted on a reverse side. The legs when in a folded position rest against the reverse side of the plate, and the legs when unfolded project from the reverse side for use as table legs.

Previously described automotive vehicles including individual table and chair apparatus are not suitable for use as a table and chair set.

SUMMARY

Various details of the present disclosure are hereinafter summarized to facilitate a basic understanding. This summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to one embodiment, an automotive vehicle having a removable table and chair set is described. The set is constructed from a removable front passenger seat configured to releasably engage a seat mounting member secured to the vehicle. The seat includes at least two legs configured to support the front passenger seat when positioned on a surface outside of the vehicle. A removable structural component of the vehicle is configured to releasably engage the vehicle and includes at least two extendable leg elements that support the structural component as a table when positioned on a surface outside of the vehicle. A removable rear passenger seat is configured to releasably engage a seat mounting member secured to the vehicle and includes at least two legs configured to support the rear passenger seat when positioned on a surface outside of the vehicle.

According to a further embodiment, a table and chair set that is removable from an associated automotive vehicle is provided. The set includes a first apparatus functioning as a seat in the associated vehicle and functioning as a chair when removed from the associated vehicle and a second apparatus functioning as one of a tailgate, a sunroof, a floor panel and a compartment cover in the associated vehicle and functioning as a table when removed from the associated vehicle. Each apparatus includes legs for conversion to the respective chair and table. The legs of the table are longer than the legs of the chair.

According to a third embodiment, a cooperative table and chair removable from an automotive vehicle is described. The chair comprises an occupant seat within the vehicle. The seat is releasably secured to the vehicle. A tailgate is releaseably secured to the vehicle, and includes legs to permit conversion of the tailgate into a table.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIG. 1 is a schematic illustration of the automotive vehicle including a removable table and chair set;

DETAILED DESCRIPTION

Figure 2A:
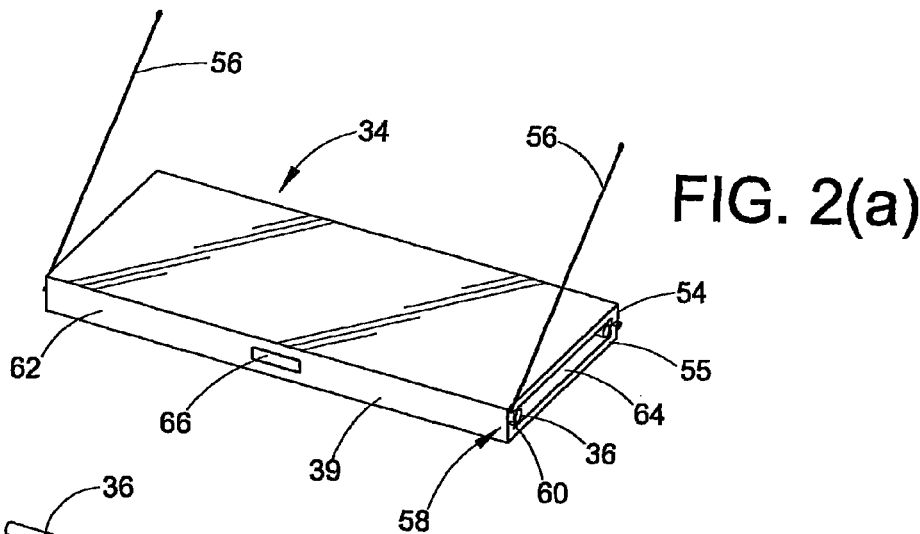
FIGS. 2(a), 2(b), 2(c) provide perspective views of a tailgate table demonstrating conversion from tailgate to table.

Referring now to FIG. 1, an automotive vehicle 10 is displayed. Vehicle 10 includes traditional components including driver seat 12, front passenger seat 14, and a rear passenger bench seat 16 all disposed within passenger compartment 18. To facilitate interpretation of the schematic illustration, the removable table and chairs set is depicted in solid lines as components of vehicle 10 and in dashed lines in a removed condition as a table and chair(s) set 20.

The automotive vehicle 10 includes front side door 24 and rear side door 26. Front side door 24 is hinged at a forward edge and rear side door 26 is hinged at a rear edge. This provides access to the passenger compartment 18 to as full an extent as possible via side door passage 28. A rear access opening 30 can be selectively sealed by a hatchback 32 which cooperates with a tailgate 34.

Front passenger seat 14, rear passenger bench seat 16 and tailgate 34 are removably secured to the vehicle 10. Front passenger seat 14 and rear passenger bench seat 16 are removable through side door passage 28 (see arrow 35). Tailgate 34 can be removed at rear access opening 30 (see arrow 37). It is noted that rear bench seat 16 may also be conveniently removed through rear access opening 30.

Tailgate 34 includes a pair of extendable table leg members 36 designed support a planar table body 39. As shown by table and chair set 20, a leg member 36 is first extended outwardly (arrow 41) from the end of tailgate 34. A final table forming position is achieved by then folding leg member 36 downwardly (arrow 43).

Front passenger seat 14 and rear passenger bench seat 16 are similarly equipped with extendable u-shaped leg members 38 and 40, respectively. Although the rear passenger seat 16 is depicted herein as a bench style seat, the vehicle can be equipped with one or more individual rear seats, all of which may be individually removable to form chairs external to the passenger compartment 18. Similarly, it is envisioned that driver's seat 12 can be removed from the vehicle and convertible to a chair externally thereto.

Advantageously, the leg members 38 and 40 of the seats 14 and 16 can be shorter in length that the leg members 36 supporting planar table body 39. In this manner, a proper table/chair set arrangement is provided where a gap exists between the seating surface 42 of chairs 14 and 16 and a lower surface 44 of planar table body 39. This allows a user to sit comfortably with legs extended below the lower surface 44 facilitating the performance of tasks on upper work surface 46 of planar table body 39. Of course, in its broadest implementation, there is no required relationship between the length of the chair legs and the length of the table legs.

Alternative table components could include a cover 48 overlying a storage compartment, a panel (also viably represented by 48) forming a portion of the trunk compartment floor, or a sunroof 50. Moreover, any generally planar structural component of the vehicle could be designed as removeable and provided with legs allowing conversion into a table in accord with the provisions outlined above.

In that regard, any of the disclosed embodiments can have integrally connected legs or legs provided as separate components in the vehicular installed condition and mated with the seat/tailgate/cover/panel/sunroof after being detached from the vehicle. For example, table legs could be stowed in a retention pocket 52 in a sidewall of the vehicle for installation externally to the vehicle 10.

Figure 2B:
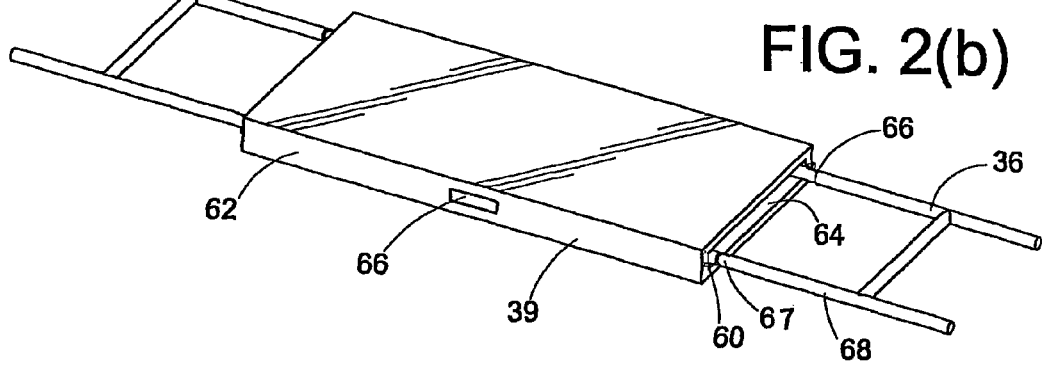
Figure 2C:
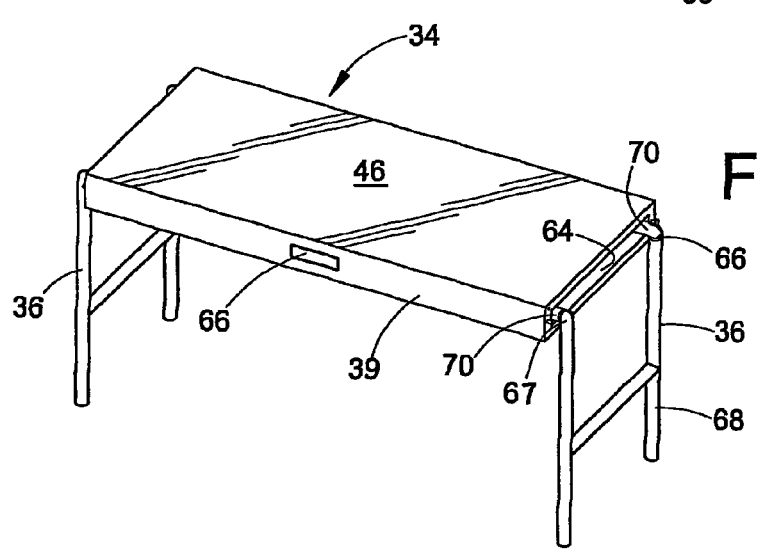

Referring now to FIG. 2(*a*), tailgate 34 is shown removed from the vehicle. Tailgate 34 includes projections 54 (only one end being visible) from an edge 55 which are received within a passage in the vehicle permitting a point of rotation thereabout. A channel accessing the passage can be provided to facilitate the separation of tailgate 34 from the vehicle.

A pair of support cables 56 can extend between the vehicle and a connection point 58 on tailgate 34. Support cables 56 can be removed from the tailgate 34 during conversion to a table. A pair of pins 60 (only one end being visible) can be provided in the edge 55 of tailgate 34. The pins 60 can be actuated by a lever 66 to facilitate selective engagement and disengagement with a receptacle in vehicle 10. Moreover, upon release of the pins 60, edge 62 of tailgate 34 can be rotated downwardly about projections 54. Leg 36 members are retained within a slot 64 (only one end being visible) formed in edge 55 of tailgate 34.

Referring now to FIG. 2(*b*), leg members 36 can be slidably removed from slot 64 into a substantially coplanar relationship with planar table body 39. With reference to FIG. 2(*c*), leg members 36 include hinged connections 67 which facilitate the rotation of lower leg portion 68 relative to upper leg portion 70 substantially tangential to table planar body 39 and into a support position therefore. A bracket apparatus (not shown) can be provided between upper leg portion 70 and lower leg portion 68 to lock leg members 36 into a stable position. Lower leg section 68 can be designed to include a telescope section locked at a chosen height with locking pins to provide table height adjustability.

Figure 3:
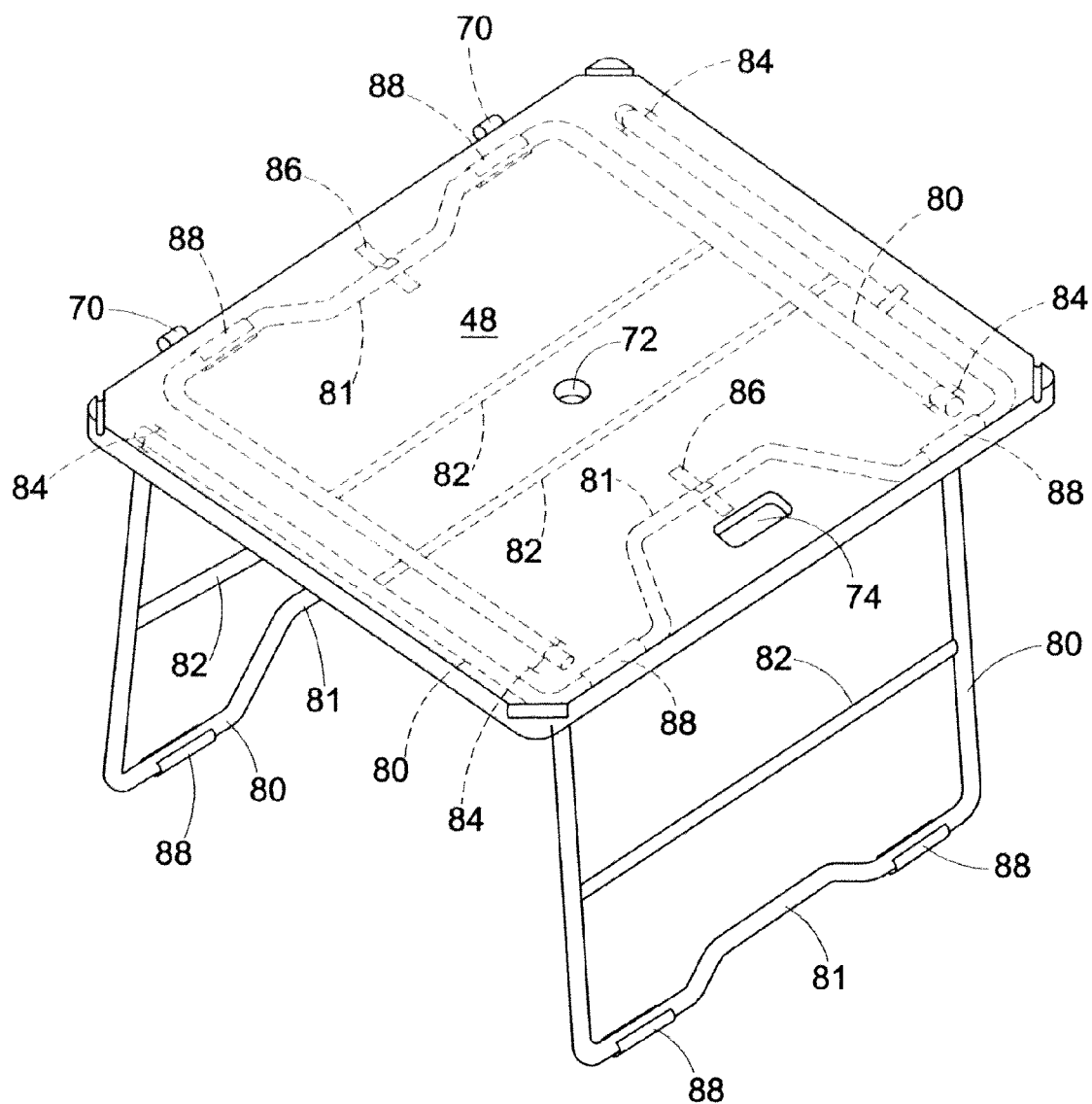
FIG. 3 is a perspective view of a storage compartment cover table.

FIG. 3 shows a table convertible from a motor vehicle storage compartment cover 48. The cover 48 has a pair of spaced teeth 70 projecting outwardly from one side edge thereof for engagement in respective openings defined in a front edge of a cargo room. The cover 48 has a hole 72 defined centrally therein for receiving the lower end of the shaft of a parasol (not shown). The cover 48 further has a handle 74 disposed in its upper surface near a side edge thereof opposite to the teeth 70 for pivotally moving the cover 48 away from the cargo area about the teeth 70.

Legs 80 comprise a generally M-shaped pipe 81, and a reinforcing pipe 82. The legs 80 are pivotally supported at ends thereof by pivot shafts 84 that are mounted on the reverse side of the cover 48. When the legs 80 are stored, i.e., folded against the cover, intermediate portions of the legs 80 are engaged and retained by respective retainers 86 mounted on the reverse side of the cover 48.

When the legs 80 are unfolded from, i.e., project from the cover 48, their pivoted ends are supported by respective pairs of links (not shown), which are pivotally joined to each other and pivotally interconnect the legs 80 and the reverse side of cover 48. When the legs 80 are folded, the links are pivotally folded into superposed relation to each other. Bumpers 88 are provided to engage the ground surface.

Figure 4:
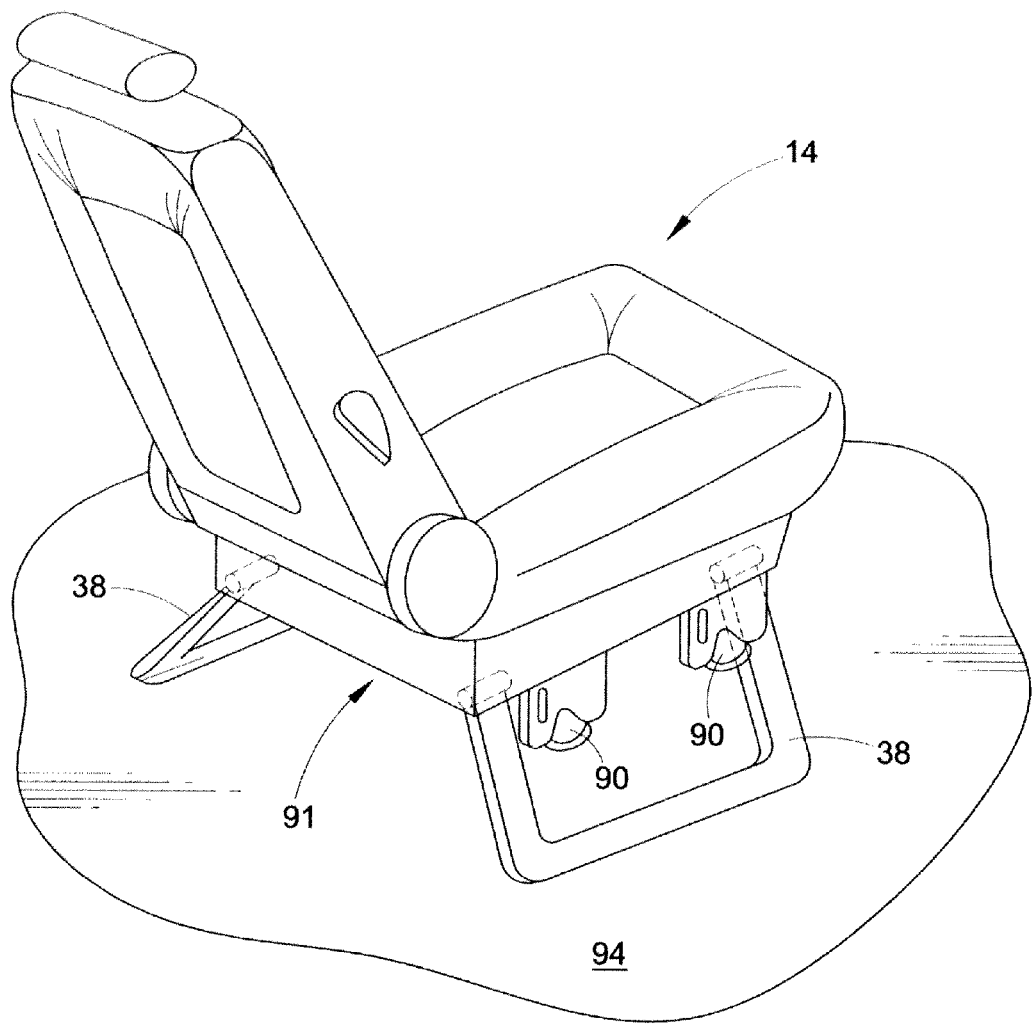
FIG. 4 is a perspective view of a front passenger seat chair.

Referring now to FIG. 4, after a passenger exits the vehicle, the seat 14 can be removed from the vehicle by releasing the latching mechanism 90 from a seat mounting member of the vehicle. The latching mechanism 90 generally is disposed on an underside 91 of the removable seat 14. Generally, the seat mounting member is secured to a floor of the vehicle which may be configured as a loop projecting in an upward direction from the floor of the vehicle. Other exemplary latching mechanisms for attaching seats to a vehicle are well known in the art and would be suitable with the present embodiment. Thereby, the latching mechanism 90 and the seat 14 are secured to the vehicle for passenger travel inside of the vehicle when the latching mechanism 90 is engaged with the seat mounting member.

The latching mechanism 90 and the seat 14 can be removed from the vehicle when the latching mechanism 90 is released of its engagement with the seat mounting member. This releasing of the latching mechanism from the seat mounting member can vary according to the model and/or the manufacturer of the vehicle in which the removable seat is installed.

A pair of legs 38 can be disposed on the underside 91 of the removable seat 14. In accordance with one embodiment, the plurality of legs 38 comprise two u-shaped legs disposed near the edges of the underside 91 of the removable seat 14. Legs 38 are secured to seat 14 via hinges 92 that allow the legs to be rotated from a stowed condition adjacent seat underside 91 to a deployed condition wherein legs 38 rest upon surface 94 forming a chair.

It is contemplated that any number of legs sufficient to support a person sitting on the removable seat 14 outside of the vehicle can be employed. For example, the legs can comprise four legs at the corners of the seat 14, each configured as a post. Further, in accordance with another embodiment, the plurality of legs can comprise six legs. These six legs may be arranged with one leg at each corner of the seat 14 and two legs at or near the center of the underside 91. Other arrangements of legs are also contemplated. The legs may be configured of steel, aluminum, plastic, or other substance sufficient to provide the legs with the desired strength and stability.

Further, each of the legs 38 can include a coupling mechanism configured to releasably secure the legs 38 to the underside 91 of the removable seat 14. In this manner the legs 38 can be rotatably secured to the underside 91 of the seat 14 when positioned in the vehicle.

In addition, each of the legs can include an adjustable design to adjust the length of each of the plurality of legs and the corresponding height of the underside 91 of the removable seat 14 from the surface 94 outside of the vehicle. For example, but not by way of limitation, the extension may have a collapsible telescoping configuration. Having adjustable legs is one manner to provide consistent distance between the seating surface and the ground. Moreover, although it is not a requirement of the present embodiment, it is noted that typical table and chair sets include chairs of a consistent height. Of course, in certain instances, varying distances between the seating surface and the ground may prove advantageous.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. An automotive vehicle including a removable table and chair set comprising:
   a removable front passenger seat configured to releasably engage a seat mounting member secured to the vehicle and including at least two legs configured to support the front passenger seat as a chair when positioned on a surface outside of the vehicle;
   a removable structural component of the vehicle configured to releasably engage the vehicle and including at least two extendable leg elements configured to support the structural component as a table when positioned on a surface outside of the vehicle; and,
   a removable rear passenger seat configured to releasably engage a seat mounting member secured to the vehicle and including at least two legs configured to support the rear passenger seat as a chair when positioned on a surface outside of the vehicle.

2. The vehicle of claim 1 wherein said rear passenger seat comprises a bench seat.

3. The vehicle of claim 1 comprising at least two removable rear passenger seats.

4. The vehicle of claim 1 further comprising a removable driver seat.

5. The vehicle of claim 1 wherein said passenger seat legs are U shaped.

6. The vehicle of claim 1 wherein said structural component comprises one of a tailgate, sunroof, floor panel, and a compartment cover.

7. The vehicle of claim 6 wherein said structural component comprises a tailgate.

8. The vehicle of claim 7 wherein said leg elements can be housed within an interior of said tailgate and are laterally extendable and downwardly rotatable to form said table.

9. The vehicle of claim 1 wherein said seat legs are extendable.

10. The vehicle of claim 1 comprising a hatchback and including passenger side doors wherein a forward door is hinged to said vehicle at a forward edge and a rear door is hinged to said vehicle at a rearward edge.

11. The automotive vehicle of claim 1 wherein said front passenger seat and said rear passenger seat each include a seating surface and wherein each seating surface is substantially the same distance from a ground surface in an assembled chair condition.

12. A table and chair set removable from an associated automotive vehicle comprising:
   a first apparatus functioning as a seat in the associated vehicle and functioning as a chair when removed from said associated vehicle; and
   a second apparatus functioning as one of a tailgate, a sunroof, a floor panel, and a compartment cover in the associated vehicle and functioning as a table when removed from said associated vehicle, wherein
   each of said first and second apparatus include legs for conversion to the respective chair and table.

13. The table and chair set of claim 12, wherein the legs of said table have a length exceeding a length of the legs of said chair.

14. The table and chair set of claim 12 wherein said table legs have an adjustable length.

15. The table and chair set of claim 12 wherein the legs of said second apparatus are housed within said apparatus when said apparatus is installed on said associated vehicle.

16. A cooperative table and chair removable from an associated automotive vehicle;
   said chair comprising an occupant seat within said associated vehicle, said seat being releasably secured to said associated vehicle;
   a tailgate being releaseably secured to said associated vehicle; and,
   said tailgate including legs to permit conversion of said tailgate into a table.

17. The cooperative table and chair of claim 16 wherein said legs engage said tailgate after said tailgate is separated from the associated vehicle.

18. The cooperative table and chair of claim 16 wherein said tailgate legs comprise components extendable from said tailgate.

19. The cooperative table and chair of claim 18 wherein said legs are stowed within a slot in a side wall of said tailgate when said tailgate is secured to said associated vehicle.

20. The table and chair of claim 16 wherein said table includes a substantially planar working surface and said chair includes a substantially planar seating surface, said seating surface being lower than said working surface when removed from said vehicle and assembled.

21. The table and chair set of claim 12 wherein said second apparatus comprises a tailgate.

* * * * *